United States Patent [19]
Collins

[11] Patent Number: 5,806,868
[45] Date of Patent: Sep. 15, 1998

[54] MANUAL CART FOR LOADING, TRANSPORTING AND UNLOADING LONG OR HEAVY OBJECTS

[75] Inventor: Marlene T. Collins, Incline Village, Nev.

[73] Assignee: Sumner Manufacturing Co., Inc., Houston, Tex.

[21] Appl. No.: 726,479

[22] Filed: Oct. 7, 1996

[51] Int. Cl.⁶ ...................................................... B62B 1/14
[52] U.S. Cl. .................. 280/79.6; 280/47.24; 280/47.19; 280/47.315; 280/655; 414/444; 414/449
[58] Field of Search .................................... 414/490, 444, 414/448, 449; 280/79.6, 79.7, 79.11, 79.2, 79.3, 47.17, 47.19, 47.24, 47.315, 47.371, 47.18, 47.26, 652, 655, 655.1

[56] References Cited

U.S. PATENT DOCUMENTS

| | | | |
|---|---|---|---|
| 1,429,432 | 9/1922 | Irrgang | 414/448 |
| 1,925,821 | 9/1933 | Schwerin | 280/47.24 |
| 2,494,997 | 1/1950 | Geistert | 280/79.6 |
| 2,536,561 | 1/1951 | Mickam | 280/79.6 |
| 2,569,050 | 9/1951 | Gref et al. | 280/79.6 |
| 2,981,549 | 4/1961 | Hotton | 280/47.31 |
| 3,785,669 | 1/1974 | Doheny | 280/47.18 |
| 5,318,315 | 6/1994 | White et al. | 280/47.18 |

*Primary Examiner*—Brian L. Johnson
*Assistant Examiner*—Avraham Lerner

[57] ABSTRACT

A manually operated cart that is specifically designed for loading, hauling and unloading long and heavy objects such as pipe, wood poles and heavy construction members without requiring the user to manually lift the objects for either loading or unloading and a method for loading, transporting and unloading a wheeled manual cart of this nature. For loading a long and heavy object, the cart manipulation handle is positioned in a lateral handle receptacle and is used by a worker to roll the cart over to an inverted position on top of the long and heavy object to be lifted and transported and after being bound to the object, is rolled back to its wheel supported position with the object so attached. After the cart and object have been manually moved by manual pushing or pulling, the worker will unload the cart by returning the cart manipulation handle to the lateral handle receptacle and by using the handle as a fulcrum to rotate the cart back to its inverted position and thus returning the object to the ground or floor. In this position the cart/object binding is released to allow the cart to be removed from the object. During cart rotation, rounded sections of an object support cradle of the cart will serve as fulcrum points for control of cart and object rotation by the laterally connected handle.

16 Claims, 3 Drawing Sheets

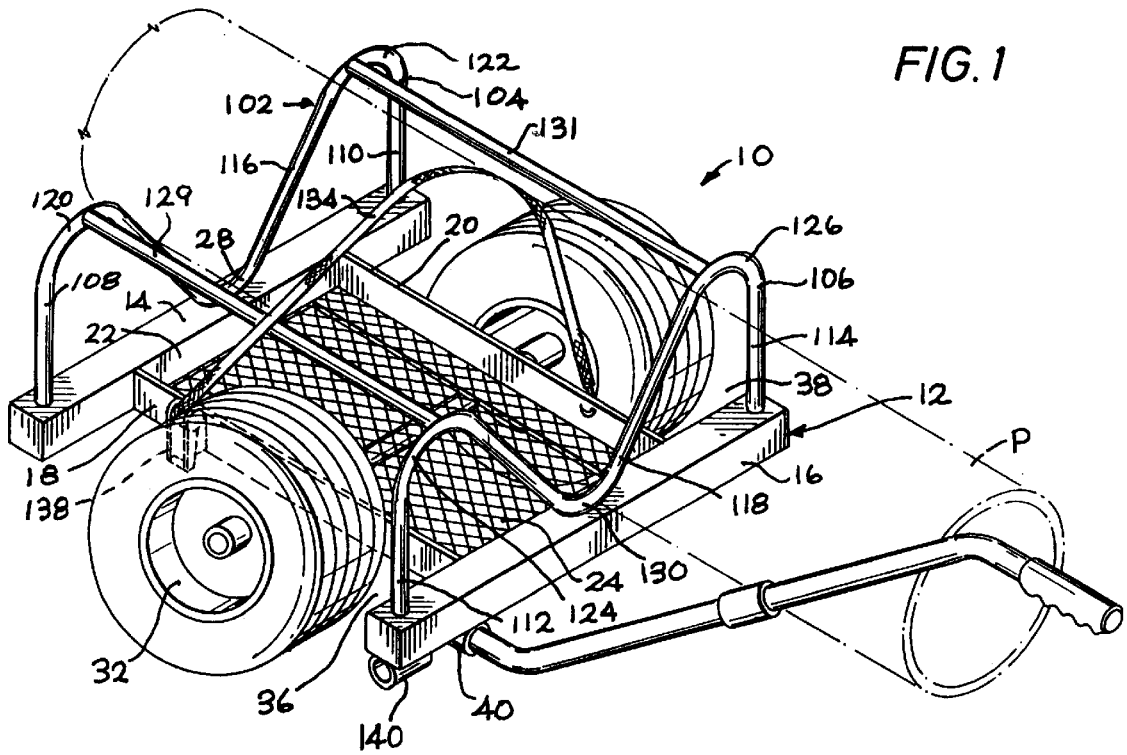
FIG. 1
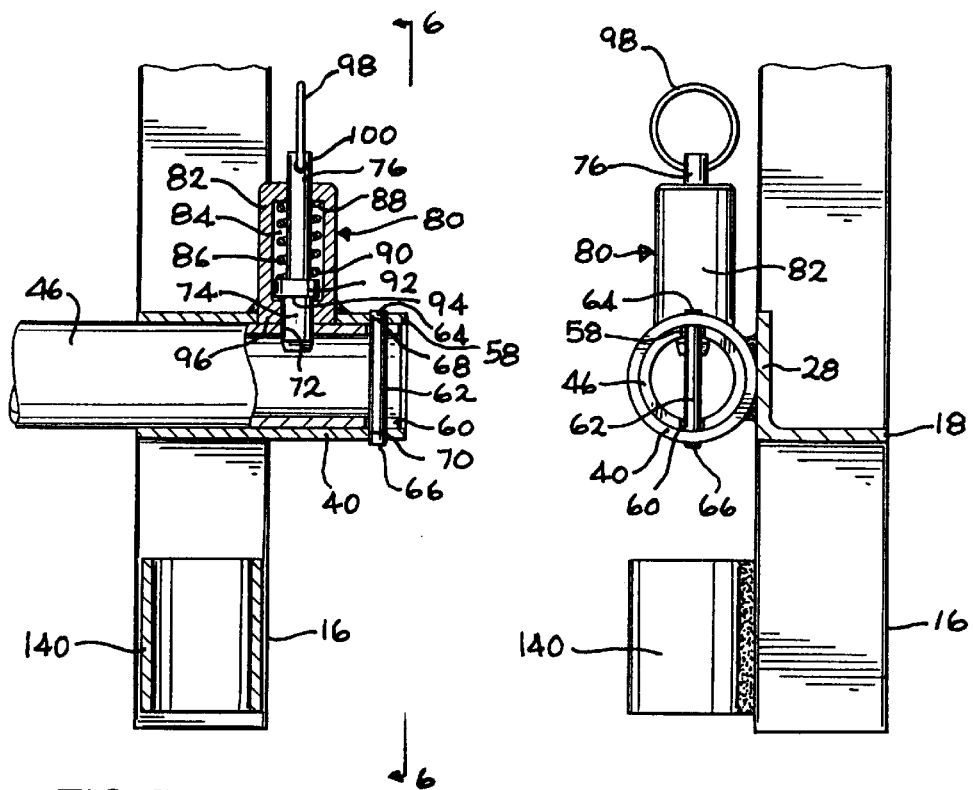
FIG. 5
FIG. 6

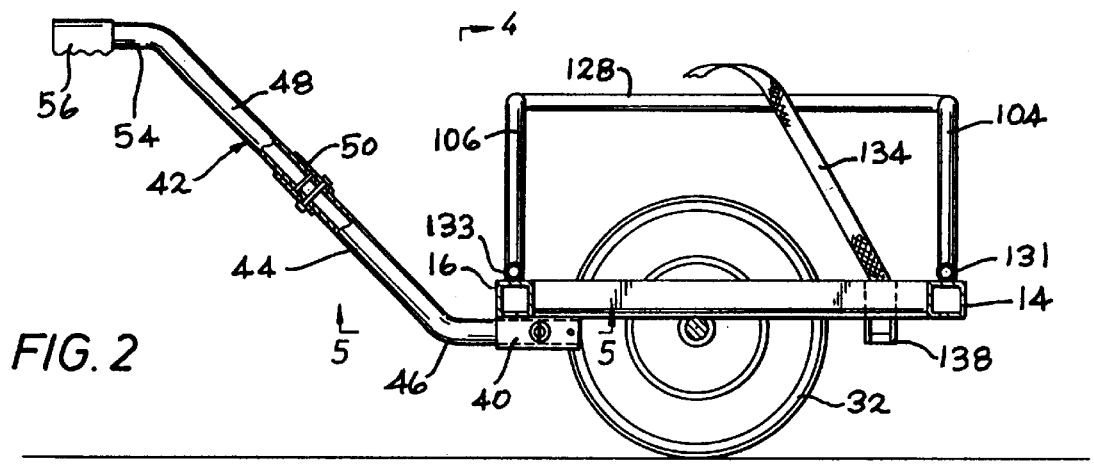

MANUAL CART FOR LOADING, TRANSPORTING AND UNLOADING LONG OR HEAVY OBJECTS

BACKGROUND OF THE INVENTION

1. Field of the Invention

This invention relates generally to manually operated carts for loading, hauling and unloading objects. More particularly, the present invention concerns manual carts that are specifically designed for loading, transporting and unloading long and heavy objects such as pipe and for unloading the same without requiring the user to manually lift the objects for either loading or unloading. The invention also concerns a method for loading, transporting and unloading a wheeled manual cart for the handling of long and heavy objects without necessitating manual lifting of the objects during loading and unloading of a wheeled cart.

2. Description of the Prior Art

In the construction industry, especially when the work is conducted inside of buildings, it often becomes necessary to transport long and heavy objects such as pipe from a receiving location to the site of its intended use. In the past, it has been the practice requiring workers to lift the heavy objects and place them on a mobile cart for movement. After arriving at the intended site, the workers must then lift the object from the cart and place it on the ground or a floor or place it on supports such as pipe jacks that will manipulate it for further construction operations such as welding, pipe connection, etc. Although the present application is discussed herein particularly as it relates to the loading, transporting and unloading of long objects such as pipe, it should be borne in mind that other long and heavy objects may be handled by the apparatus as well. For example, metal beams may be loaded, transported and unloaded through use of the apparatus of this invention. Also, heavy objects that are not particularly long may also be loaded, transported and unloaded through use of the apparatus of this invention. Without requiring workers to accomplish manual lifting of the objects during loading and unloading operations.

SUMMARY OF THE INVENTION

It is a principal feature of the present invention to provide a novel manual wheeled cart which is designed to permit cart loading, transportation and unloading without necessitating lifting of the heavy objects.

It is another feature of this invention to provide a novel manual cart that is of lightweight construction and which can be inverted and positioned over an object to be transported and secured to the object for transportation and then returned to its wheel supported position, with lifting of the object being accomplished during movement of the cart from the loading position to the wheel supported position.

It is also a feature of the present invention to provide a novel manual cart for loading, transportation and unloading long and heavy objects and which incorporates a plurality of handle receptacles into which a cart handle may be selectively positioned to enable manual cart manipulation for loading, transporting and unloading thereof.

Briefly, the various objects and features of the present invention are realized by the provision of a manually operated wheeled cart having a framework being provided with one or more wheel and axial assemblies which provide wheeled support for the cart to enable it to be manually moved along a surface such as the ground, a floor, etc. for moving objects, particularly heavy objects from place to place. The framework structure of the cart is provided with an intermediate cart support section which is adapted to receive a load, particularly a heavy load which may be centered or selectively positioned with respect to the wheel and axial assembly or assemblies. For the hauling of long objects, particularly long and heavy and objects such as pipe, structural beams, wood posts, etc., the cart is provided with a generally V-shaped cradle into which one or more long objects may be placed for transportation. The cart mechanism is also provided with an onboard tie down assembly having a tie down strap that is utilized to secure the long object or objects within the V-shaped cradle. The framework of the cart is also provided with handle receptacles that selectively receive a cart manipulation handle. One of the handle receptacles is oriented so that the handle may be oriented for pulling or pushing the cart on its wheels for transportation of the heavy or long and heavy objects. Another handle receptacle is oriented for lateral positioning of the handle, to thus enable the handle to be utilized as a lever for lateral rotation of the cart during loading and unloading operations.

For loading a long and heavy object or heavy objects, the cart manipulation handle is positioned in the lateral handle receptacle and is rolled over to an inverted position on top of the long and heavy object to be lifted and transported. The cart is positioned so that its V-shaped cradle will receive the long and heavy object. The tie down strap is then positioned to secure the object in assembly with the cart and appropriately tightened so that the long object is retained in assembly with the V-shaped cradle. With the handle in the lateral handle receptacle, the worker will then use the handle as a lever to rotate the cart back to its wheeled position. During this rotation activity, rounded corner sections of the object support cradle will function as fulcrums so that the loaded cart may be rolled back to its wheel supported position. When the wheel supported position is accomplished, the worker will the shift the handle manipulation cart to its towing or pushing receptacle and will then move the loaded cart on its wheels, thus transporting the object to its intended site of use.

For unloading, the worker will then return the cart manipulation handle to the lateral handle receptacle and will use the cart handle as a fulcrum to rotate the cart back to its inverted position. During this rotation, the rounded sections of the object support cradle will again serve as fulcrum points for rotation of the cart to its inverted position. Upon reaching the inverted position of the cart, the object retainer strap will be loosened to allow the object to descend by its weight to a support surface. Also, if desired, the retainer strap may be loosened prior to inverting movement of the cart to thus permit the long object to be "dumped" from its support cradle as the cart nears the inverted position thereof.

BRIEF DESCRIPTION OF THE DRAWINGS

The various objects and advantages of this invention will become apparent to those skilled in the art upon an understanding of the following detailed description of the invention, read in light of the accompanying drawings which are made a part of this specification and in which:

FIG. 1 is an isometric illustration of a manually operated wheeled cart that is constructed in accordance with the present invention, showing the cart handle in its pushing or towing receptacle and showing by way of broken lines, a long object such as a pipe being positioned within the support cradle of the cart.

FIG. 2 is a section view taken along line 2—2 of FIG. 3 and showing detailed structural aspects of the cart framework and wheel support assembly.

FIG. 3 is a plan view of the manually operated wheeled cart of FIGS. 1 and 2.

FIG. 4 is a sectional view taken along line 4—4 of FIG. 2 and showing a significant portion of the cart structure by way of elevation.

FIG. 5 is a sectional view taken along line 5—5 of FIG. 2 and showing a handle receptacle locking and release mechanism securing the cart handle in releasable assembly with the cart towing and pushing receptacle.

FIG. 6 is a view taken along line 6—6 of FIG. 5 and showing other details of the pushing and towing receptacle of the manual wheeled cart and further showing the handle being retained by the handle locking and release mechanism thereof

DETAILED DESCRIPTION OF PREFERRED EMBODIMENT

Figure 7:
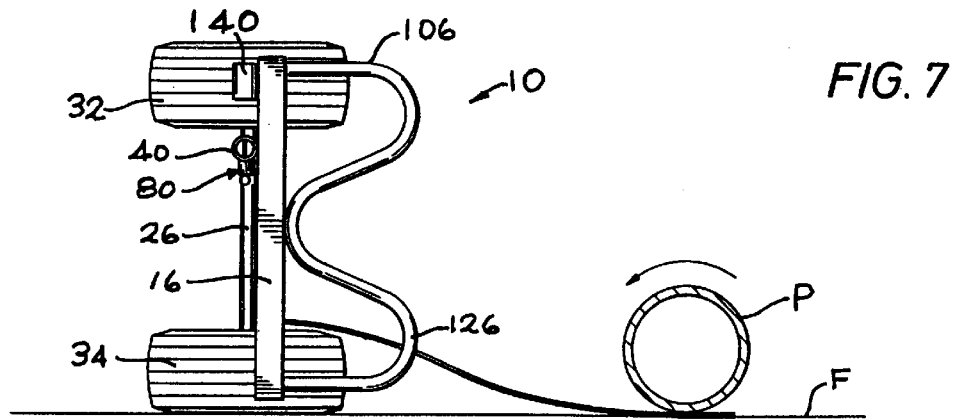
FIG. 7 is an end view type pictorial illustration showing a long object being rolled onto the retainer strap and showing the cart partially inverted and lying on its side in preparation for loading of the object.

Referring now to the drawings and first to FIG. 1, a manually operated wheeled cart constructed in accordance with the present invention is shown generally at 10 and is shown to be provided with a cart framework illustrated generally at 12 with the framework being provided with a pair elongate structural end elements 14 and 16 which are shown to be of rectangular cross-sectional configuration, such as square tubing, but which may conveniently take any other suitable configuration without departing from the spirit and scope of the invention. A pair of spaced angle members 18 and 20 are welded or otherwise connected at respective ends thereof to the end members 14 and 16. These angle members cooperate with the end members to define a rectangular receptacle 22 having its bottom closed by an expanded metal panel 24 thus providing for support of objects in the receptacle. To provide for transport of articles by the cart assembly, an axial 26 is connected to the bottom flanges 28 and 30 of the respective angle members 18 and 20. A pair of wheel and bearing assemblies 32 and 34 are rotatably assembled to the axial 26 and are positioned within respective wheel recesses 36 and 38 that are defined by the respective end portions of the end members which extend outwardly beyond the angle members 18 and 20.

To enable a user to manually move the cart and to enable the cart to be manually inverted and otherwise manipulated according to the present invention, a handle receptacle 40 is fixed such as by welding to the bottom flange of angle member 18 or to the bottom wall of end member 16 or both. As shown in FIG. 2, the handle receptacle 40 is shown to be of sufficient length to extend beyond the bottom wall of the end member 16 and to engage the bottom flange 28 of angle member 18. The handle receptacle 40 is also provided with a handle locking and release mechanism which will be described in detail hereinbelow in connection with FIGS. 5 and 6.

A handle assembly shown generally at 42 is provided with a lower handle section 44 having an offset end 46 that is adapted to be received within the handle receptacle 40. The handle also includes an upper handle section 48 which is adapted for releasable connection to the lower handle section 44 by means of a handle connector 50 having a transverse retainer bolt 52 for securing the upper and lower handle sections in assembly. If desired, a handle extension may be placed between the upper and lower handle sections and may be connected thereto by a tubular connector similar to that shown at 50–52. At its upper end, the upper handle section 48 is offset to define a hand grip section 54 having a hand grip member 56 placed thereabout to facilitate comfort and security during manual use of the handle assembly.

As shown in FIGS. 5 and 6, the lower offset handle section 46 is machined at the end thereof to define a pair of opposed alignment recesses 58 and 60 that, when the handle assembly is properly oriented relative to the handle receptacle 40, will receive an alignment and positioning pin 62 having its upper and lower ends 64 and 66 received within diametrically opposed apertures 68 and 70 of the handle receptacle 40. It is desirable to insure locking of the handle section 46 to the handle receptacle so that wheeled cart 10 may be safely and efficiently manipulated by appropriate movement of its handle assembly. Accordingly, as shown in FIGS. 5 and 6, the handle receptacle is provided with a locking and release mechanism which, when the handle section 46 is properly aligned and positioned with respect to the handle receptacle capable of locking the handle assembly to the handle receptacle. As shown particularly in FIG. 5, the lower offset section 46 of the handle is provided with a locking aperture 72 which receives the lower locking end 74 of a locking pin shown generally at 76. A locking mechanism shown generally at 80 is provided with a lock housing 82 having an internal spring chamber 84 with a compression spring 86 positioned therein. The upper end of the compression spring bears against an internal shoulder 88 while the lower end of the compression spring bears against an upwardly facing shoulder 90 that is defined by a circular enlargement of the locking pin 76. This circular enlargement or stop also defines a downwardly facing stop shoulder 94 that is adapted for stopping engagement with a lower transverse wall 96 of the lock housing. The wall 96, in turn, defines an aperture through which the lower locking end 74 of the locking pin normally extends.

To enable manual retraction of the locking pin to a position for releasing the lower handle section 46. The upper portion of the locking pin 76 is provided with a pull ring 98 having a portion thereof extending through an aperture 100 of the locking pin. For retraction movement, a user will grasp the pull ring 98 and will apply a force to the locking pin causing it to move in the outward direction, against the compression of the spring 86. When the lower locking end 74 of the locking pin has cleared the aperture 72, the lower handle section 46 will have been released and may simply be withdrawn from the handle receptacle 40 by linear extraction movement.

In the reverse, for locking assembly of the handle to the handle receptacle, the lower offset end 46 of the handle is inserted into the receptacle 40 sufficiently to engage the lower locking end 74 of the locking pin. The user will then retract the locking pin by pulling it outwardly against the compression of the spring 86. With the locking pin retracted, the lower offset end 46 of the handle is then moved into engagement with the alignment and positioning pin 62. If the handle is misaligned with respect to the pin 62, the end surface of the handle will simply contact the pin. Thereafter, the lower handle section 46 may be rotated to register the alignment recesses 58 and 60 with the pin thereby permitting full insertion of the lower handle section so that the alignment pin 62 is fully received within the registering alignment recesses 58 and 60.

As the handle is inserted into the receptacle with the locking pin retracted, as soon as the free end of the handle begins moving past the lower locking end of the locking pin, the locking pin may be released thus allowing its movement by the force of the compression spring 86 into engagement with the outer cylindrical surface of the lower handle section. As soon as the lower handle end has moved sufficiently to engage the locking and alignment pin within the recesses 58 and 60, the locking aperture 72 of the lower handle section will be in registry with the lower locking end of the locking pin. When this occurs, the force of the compression spring 86 will snap the lower locking end 74 of the locking pin through the receptacle 72 to thereby securely lock the handle against inadvertent disassembly from the handle receptacle.

According to the principals of the present invention, it is desirable to utilize the wheeled cart for transportation of heavy objects and especially heavy, long objects such as pipe. It also desirable to utilized the wheeled cart in such manner that heavy or heavy and long objects may be loaded and unloaded without necessitating lifting of them by workers. Even further, it is desirable to ensure proper positioning of long and heavy objects on the wheeled cart so that the heavy loads, thereof, will be properly centered for safe and efficient manual movement thereof. To facilitate these enumerated features, the wheeled cart mechanism of this invention is provided with a cradle assembly shown generally at 102 and having cradle end members 104 and 106 that are connected to respective end members 14 and 16 of the cart framework. For its rigid connection with the framework, cradle end member 104 defines parallel connection legs 108 and 110 that preferably penetrate through apertures in the end member 14 and are appropriately welded about the apertures to permantmently fix the cradle end member to the frame end member. Cradle end member 106 is also provided with parallel leg members 112 and 114 that are retained in the same manner in fixed relation with end member 16 of the cart framework. The cradle end members 104 and 106 are bent intermediate the end portions thereof to define a pair of generally V-shaped cradle recesses 116 and 118 which cause an elongate load such as a pipe to become centered with respect to the wheeled cart when the load is secured in assembly with the cart.

At opposed sides of each of the cradle end members 104 and 106 of the cradle framework 102, the cradle end members are bent to define curved fulcrum shoulders which permit the cart to be rolled from its wheeled position to an inverted position, or to be returned to its wheel support position from the inverted position even while supporting a heavy load within the cradle recesses. As shown, the cradle end member 104 defines curved shoulders 120 and 122 while the cradle end member 106 defines curved shoulders 124 and 126. A pair of longitudinal braces 129 and 131 are interconnected at the respective ends thereof to the cradle end members 104 and 106 for the purpose of materially enhancing the structural integrity of the cradle framework. The cradle end members are further bent intermediate the extremities thereof to define curved lower support ends 128 and 130 of the V-shaped cradle recesses or notches. Typically these curved sections 128 and 130 of the tubular cradle end members will contact the intermediate portions of the framework end members 14 and 16 and, if desired, may be welded or otherwise connected to the end members at the points of engagement. Thus, the cradle framework functions to center an elongate load with respect to the cart framework and to transmit forces of the load directly to the center portions of the respective end members.

During manual use of the cart for hauling various types of loads, particularly long and heavy loads such as pipe as shown in broken line in FIG. 1, it will be appropriate to insure that the load is firmly latched to the cart and the cart to the load. For this purpose, at least one toggle actuated tie down strap is provided at 134 having an end connector 136 that is in the form of a hook that is receivable within a retainer aperture that is defined in the vertical flange of the angle member 20 as shown particularly in FIGS. 1, 3, and 4. For tightening the retainer strap 134, a toggle type strap actuator 138 is fixed to the vertically oriented flange of the angle member 18 and may be manipulated in conventional manner to tighten the strap about the load.

Figure 10:
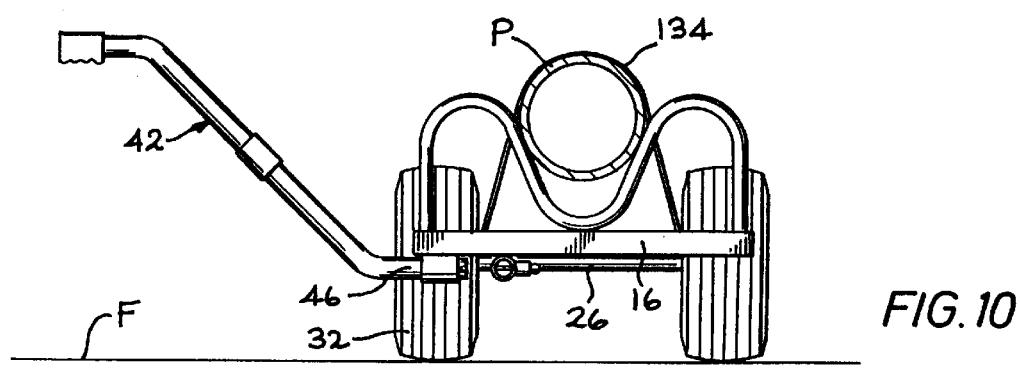
FIG. 10 is a further pictorial illustration showing the manual wheeled cart after completion of rotation to its wheel supported position and showing the long object being secured to the support cradle of the cart by the retainer strap.

According to the method by which the manually operated cart of this invention is used, to eliminate the need for manual lifting and placement, as well as manual unloading of the cart, the cart is inverted over the object or objects to be lifted, transported and unloaded and the cart and object are then secured together by tightening the retainer strap about the object, with the object being located within the V-shaped centralizing recess or notch of the cradle framework. After this has been done, the cart is then manually manipulated or "rolled" from its inverted position to its wheel supported position by appropriate manual manipulation, using the handle assembly as a lever and the rounded cradle shoulders and the wheel assemblies fulcrum points. To permit lateral cart rolling, the cart is provided with one or more laterally oriented handle receptacles, one being shown at 140 and taking the form of a section of generally cylindrical tubular stock that is connected by welding to the lower surface of the end member 16 and adjacent one end thereof To accomplish rolling of the cart, the handle assembly is disconnected from the locking receptacle 40 in the manner described above and its lower offset end 46 is inserted into the handle receptacle 140 such as is shown in FIG. 10. The handle assembly is then manipulated as a lever, causing the lightweight load transport cart to be rotated between its wheel support and inverted positions. During lateral rotation of the wheeled cart by the leverage of the handle assembly, one of the wheels, then the curved fulcrum shoulders of the cradle framework will serve sequentially as fulcrums so that the cart can be manually rotated in controlled manner, causing raising or lowering of the object depending upon the direction of rotation.

Figure 8:
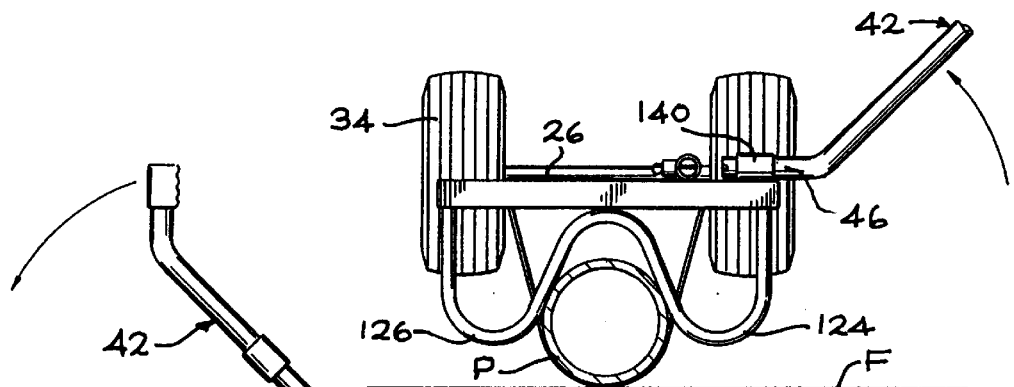
FIG. 8 is a similar pictorial illustration showing the manual wheeled cart in its inverted position over the object to be lifted and transported and showing the cart and object firmly secured by the retainer strap, with the object being positioned within the support cradle of the cart.

The manner by which the wheel supported cart is utilized to load and transport heavy elongate objects such as pipe is shown pictorally by FIGS. 7–10. Typically, the cart is located on its side as shown in FIG. 7 with the retainer strap 134 released from angle member 20 and lying on a flat surface such as the ground or a floor "F". The elongate object is then rolled onto the retainer strap as shown in FIG. 7. After this has been done, the lightweight cart is then positioned on top of the object "P" so that the V-shaped cradle receptacles will be centered with respect to the object. The free end of the retainer strap is then connected the cart framework by locating the connector hook 136 within the appropriate aperture of angle member 20. After this has been done, the retainer strap ratchet mechanism 138 is then manually manipulated to tighten the strap thereby securing the object "P" to the cart and also securing the cart to the object as shown in FIG. 8. After this has been done, the handle assembly 42 is then inserted into the second or transverse handle receptacle 140 and is used as a lever for rotation of the object and the cart from the inverted position shown in FIG. 8 to the wheel supported position shown in FIG. 10. Since the handle assembly is not locked to the handle receptacle 140, it may be rotated within the handle receptacle to any desired position which will enable the user to comfortably use the handle as a lever for rotation of the cart with its object secured thereto.

Figure 9:
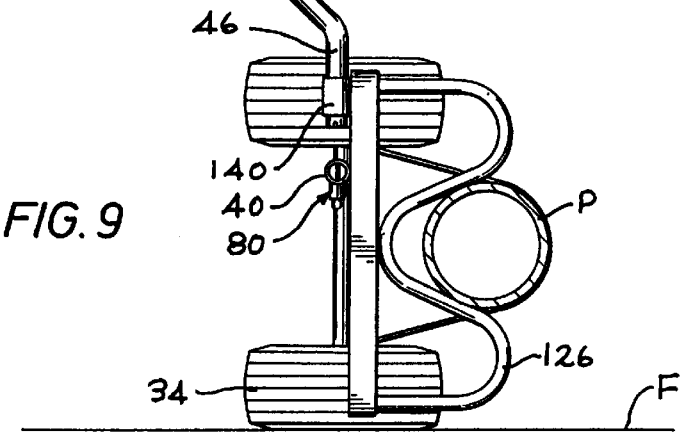
FIG. 9 is a similar pictorial illustration to that of FIGS. 7 and 8 and showing the manual wheeled cart lying on its side and being rotated to its wheel supported position, with the object being secured in the support cradle of the cart by the retainer strap.

It should be borne in mind that the rounded shoulders 124 and 126 of each of the cradle ends will serve as fulcrums about which the wheeled cart is rolled. Thus, as the handle is rotated in the manner shown by the arrow in FIG. 8, the object "P" will rotate on the surface "F" until the rounded fulcrum shoulder 126 comes into contact with the surface. After this has been done, continued rotation of the handle as a lever about the curved fulcrum shoulder will cause the wheeled cart to be rotated about the contact of the curved fulcrum shoulder with the surface "F". As the wheeled cart is rotated about the fulcrum shoulder, and since the object is secured within the cradle of the cart, the object will be lifted by the cradle. At a certain point of the rotation of the wheeled cart, one of the wheels 34 will come into contact the surface "F" and the curved fulcrum shoulder 126 will leave its contact with the surface F as shown in FIG. 9. Further lateral rotation of the wheeled cart will then cause the wheel 34 to serve as a fulcrum about the wheeled cart is rotated until such time as the opposite wheel assembly 124 also comes into contact with the floor surface "F" as shown by the wheel supported position as shown in FIG. 10. Thus, it is not necessary to accomplish manual lifting and placement of the object within the cradle of the cart. The object is lifted by rotation of the wheeled cart through use of the handle as a fulcrum. After reaching the wheel supported position of FIG. 10, the lower offset end 46 of the handle assembly is removed from the transverse handle receptacle 140 and the handle is returned to its locked position within the handle receptacle 40 being locked by the locking mechanism 80. The handle may then be utilized to push or pull the cart with the object loaded thereon to an intended site for delivery of the object.

The object unloading operation is accomplished by simply reversing the procedure discussed above. Utilizing the handle assembly in the lateral handle receptacle as shown in FIG. 10, an upward force is applied to the handle, causing lateral rotation of the cart using the wheel assembly 34. At a certain point in the rotation, the rounded fulcrum shoulder 126 of the cradle framework will come into contact with the surface "F" and will thereafter serve as a "rolling" fulcrum about which the cart is rolled, using the handle assembly 42 as a lever. Continued rotation of the wheeled cart from the FIG. 9 position to the position shown in FIG. 8 will then occur by continued rotation of the handle as a lever, until the object "P" comes into contact with the surface "F". After the cart has reached its inverted position as shown in FIG. 8, the retainer strap 134 may be released and then the cart may be lifted from or rotated away from the object, leaving the object resting on the retainer strap 134. The object will then be rolled or moved laterally to a position clearing the retainer strap thus allowing the wheeled cart to be moved to another location for further use.

The wheeled cart of this invention may also be utilized for hauling objects that are sufficiently small to be placed on the expanded metal platform 24 located between the wheel assemblies and between the end members 14 and 16. If the small object or objects are sufficiently heavy that manual lifting thereof is undesirable, the wheeled cart may be inverted over the objects in the same manner as shown in FIG. 8, with the retainer strap being used to secure the objects and the cart in assembly. The cart may then be rotated laterally to its wheel supported position by the leverage of the handle within the transverse handle receptacle 140, thus accomplishing lifting of the heavy objects in the process of rotation. Unloading of these objects from the cart may then be accomplished in the same manner as discussed above in connection with lowering of the the object "P" by lateral rotation of the wheeled cart.

In view of the foregoing, it is evident that the present invention is one well adapted to attain all of the objects and features that are hereinabove set forth, together with other objects and features which are inherent in the apparatus disclosed herein.

As will be readily apparent to those skilled in the art, the present invention may be produced in other specific forms without departing from its spirit, scope and essential characteristics. The present embodiment is therefore to be considered as illustrative and not restrictive, the scope of this invention being defined by the claims rather than by the foregoing description, and all changes which come within the meaning and range of equivalence of the claims are therefore intended to be embraced therein.

What is claimed is:

1. A method for manually loading, transporting and unloading objects, comprising:
   (a) providing a wheeled cart having a wheel supported position for transporting objects, having an object support framework, having a removable elongate handle, a first handle receptacle for receiving said removable elongate handle for pushing and pulling movement of said wheeled cart and a second handle receptacle being oriented in transverse relation with said first handle receptacle and further having retainer means for retaining said object to said wheeled cart;
   (b) inverting said wheeled cart over said heavy object;
   (c) with said retainer means, securing said wheeled cart and said object assembly;
   (d) locating an end portion of said elongate handle within said second handle receptacle
   (e) with said elongate handle as a lever laterally rotating said wheeled cart and said wheeled cart and said object in assembly therewith from said inverted position of said wheeled cart to said wheel supported position thereof
   (f) positioning said end portion of said elongate handle within said first handle receptacle;
   (g) using said elongate handle moving said wheeled cart and said object retained in assembly therewith to a described location;
   (h) locating said end portion of said handle within said second handle receptacle;
   (i) using said elongate handle as a lever, rotating said wheeled cart and said object to the inverted position of said wheeled cart; and
   (j) releasing said retainer means to thus release said object from assembly with said wheeled cart.

2. The method of claim 1, wherein a cradle being fixed to said wheeled cart and defining a recess for receiving said object and position said object relative to said wheeled cart, said method comprising:

during said rotating of said wheeled cart between said inverted position and said wheel supported position, using said cradle as a fulcrum in contact with a surface on which said wheeled cart rests.

3. The method of claim 2, wherein said cradle defining a recess within which the object is received and further defining a rounded fulcrum section, said method comprising:

during said rotating of said wheeled cart said rounded fulcrum section of said cradle having rolling movement on the surface.

4. The method of claim 1 wherein said first handle receptacle having a handle lock adapted for a locking position and a release position relative to said end portion of said handle, said method comprising:

(a) prior to moving of said wheeled cart with said handle, positioning said handle lock at said locking position for locking said end portion of said handle to said first handle receptacle; and (b) positioning said handle lock at said release position to permit movement of said elongate handle from said first handle receptacle to said second handle receptacle.

5. A manually operated wheeled cart for loading, transporting and unloading objects, comprising:

(a) a cart framework;

(b) at least one wheel axle being fixed to said cart framework;

(c) at least one pair of wheel assemblies being rotatably connected to said wheel axle and providing for wheel supported movement of said wheeled cart on a surface;

(d) means for supporting an object on said wheeled cart (e) means for retaining an object in assembly with said wheeled cart (f) a first handle receptacle being fixed to said cart framework and being oriented for handle operated pushing and pulling movement of said wheeled cart on a surface (g) a second handle receptacle being fixed to said cart framework and being oriented generally parallel to said wheel axle and in transverse relation with said first handle receptacle; and (h) an elongate handle being selectively positionable within said first handle receptacle for pushing and pulling movement of said wheeled cart on a surface and being selectively positionable within said second handle receptacle for lateral rotation of said wheeled cart from a wheeled supported position to an inverted position, while using said handle as a lever.

6. The manually operated wheeled cart of claim 5, wherein said means for supporting an object on said wheeled cart comprises:

a support cradle being provided on said cart framework and defining an object receptacle within which the object is at least partially received.

7. The manually operated wheeled cart of claim 6, wherein:

(a) said cart framework defining ends and sides; and (b) said support cradle defining a generally V-shaped object support at each of said ends of said cart framework said V-shaped object support containing and centrally orienting long objects being transported by said wheeled cart.

8. The manually operated wheeled cart of claim 6, wherein:

(a) said support cradle defining rounded shoulders at sides of said cart framework; and (b) upon transverse rotation of said wheeled cart by said handle between said wheel supported position and said inverted position said rounded shoulders of one side of said cart framework having rolling contact with the surface and serving as a fulcrum about which said wheeled cart is laterally rotated by using said handle as a lever.

9. The manually operated wheeled cart for loading, transporting and unloading objects of claim 5, wherein said means for retaining an object on said wheeled cart comprising:

(a) a retainer strap adapted for securing the object to said wheeled cart and having an end portion for attachment to said cart framework; and (b) a retainer strap tightening mechanism being fixed to said cart framework and being manually actuatable for tightening said retainer strap about the object to bind the object to said cart framework.

10. The manually operated wheeled cart for loading, transporting and unloading objects of claim 5, wherein:

said first handle receptacle having means for locking said elongate handle in releasable assembly therein.

11. The manually operated wheeled cart for loading, transporting and unloading objects of claim 10, wherein said means for locking comprising:

(a) a locking aperture being defined in said elongate handle;

(b) a lock housing being fixed to said first handle receptacle;

(c) a locking pin being located within said lock housing and being moveable between locking and release positions, said locking pin having a locking portion thereof adapted for locking position within said locking aperture of said elongate handle; and (d) means for urging said locking pin toward said locking position.

12. The manually operated wheeled cart for loading, transporting and unloading objects of claim 11, wherein said first handle receptacle comprising:

(a) a tubular element being fixed to said cart framework in off-center relation therewith and oriented in transverse relation with said wheel axle;

(b) a handle alignment and positioning element being located within said tubular element; and (c) said elongate handle having an end portion defining at least one alignment and positioning recess and adapted for receiving said handle alignment and positioning element and orienting said elongate handle for use in pulling and pushing said wheeled cart.

13. The manually operated wheeled cart for loading, transporting and unloading objects of claim 5, wherein said cart framework comprising:

(a) a pair of substantially straight end members being disposed in generally parallel relation;

(b) a pair of substantially straight side members having ends thereof connected to said end members, said end members and said side members defining a generally rectangular framework; and (c) a generally rectangular support platform having edges thereof being secured to said end members and said side members and adapted for support of objects located between said wheel assemblies.

14. The manually operated wheeled cart for loading, transporting and unloading objects of claim 13, wherein:

said end members project laterally beyond said side members and define wheel recesses on each side of said cart framework within which said wheel assemblies being at least partially located.

15. The manually operated wheeled cart for loading, transporting and unloading objects of claim 13, wherein:

said wheel axle being connected to said side members and having end portions thereof extending outwardly beyond said side members for support of said wheel assemblies.

16. The manually operated wheeled cart for loading, transporting and unloading objects of claim 5, wherein said elongate handle comprises:

(a) an upper handle section adapted for gripping by a user;

(b) a lower handle section having a lower angulated end adapted to be selectively positioned within said first and second handle receptacles; and (c) a connector interconnecting said upper and lower handle sections and adapted to receive a handle extension for adding to the length of said elongate handle.

* * * * *